(12) United States Patent
Leobandung (10) Patent No.: US 11,734,461 B2
(45) Date of Patent: Aug. 22, 2023

(54) DIGITAL LOGIC LOCKING OF ANALOG CIRCUITS

(71) Applicant: International Business Machines Corporation, Armonk, NY (US)

(72) Inventor: Effendi Leobandung, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 17/543,701

(22) Filed: Dec. 6, 2021

(65) Prior Publication Data

US 2023/0177219 A1 Jun. 8, 2023

(51) Int. Cl.
*G06F 21/75* (2013.01)
*H03K 19/0175* (2006.01)

(52) U.S. Cl.
CPC ..... *G06F 21/75* (2013.01); *H03K 19/017581* (2013.01)

(58) Field of Classification Search
CPC .................. G06F 21/75; H03K 19/017581
USPC ........................................................ 726/34
See application file for complete search history.

(56) References Cited

U.S. PATENT DOCUMENTS

| | | | |
|---|---|---|---|
| 7,195,931 B2 | 3/2007 | Jarvis | |
| 9,536,584 B2* | 1/2017 | Nebashi | G11C 11/1675 |
| 10,423,749 B2 | 9/2019 | Rajendran | |
| 2009/0315617 A1* | 12/2009 | Rosik | G05F 3/08 |
| | | | 327/538 |
| 2019/0018936 A1 | 1/2019 | Zhou | |
| 2019/0129892 A1 | 5/2019 | Sinanoglu | |
| 2019/0311156 A1 | 10/2019 | Tehranipoor | |
| 2019/0340394 A1* | 11/2019 | Sinanoglu | G01R 31/31719 |
| 2020/0342142 A1* | 10/2020 | Savidis | G06F 21/75 |

OTHER PUBLICATIONS

M. Rahman et al., "Defense-in-depth: A recipe for logic locking to prevail," Integration, the VLSI Journal, Jan. 2020, 19 pp.
Mahendra Rathor et al., "Robust Logic locking for Securing Reusable DSP Cores," IEEE Access, vol. 7, Aug. 2019, pp. 120052-120064.

(Continued)

*Primary Examiner* — Dereena T Cattungal
(74) *Attorney, Agent, or Firm* — Samuel Waldbaum; Otterstedt & Kammer PLLC (57) ABSTRACT

An analog circuit has a first plurality of transistors that are connected as a first selectable resistance in the analog circuit, and a second plurality of transistors that are connected as a second selectable resistance in the analog circuit. In an unlocked state of the analog circuit, the first selectable resistance matches the second selectable resistance within a designed ratio and tolerance. In a locked state of the analog circuit, the first selectable resistance and the second selectable resistance do not match within the designed ratio and tolerance. A controller retrieves a logic lock key from an off-chip memory and selects the first and second selectable resistances, thereby setting the analog circuit to its unlocked state, by sending respective first and second portions of the logic lock key to operate the first and second pluralities of transistors.

18 Claims, 5 Drawing Sheets

(56) References Cited

OTHER PUBLICATIONS

Muhammad Yasin et al., "Evolution of logic locking," IFIP/IEEE International Conference on Very Large Scale Integration (VLSI-SoC), Oct. 2017, 6 pp.

Muhammad Yasin et al., "Pre-SAT Logic Locking." Trustworthy Hardware Design: Combinational Logic Locking Techniques. Springer, Cham, Jan. 2020, pp. 33-46.

\* cited by examiner

DIGITAL LOGIC LOCKING OF ANALOG CIRCUITS

BACKGROUND

The present invention relates to the electrical, electronic, and computer arts, and more specifically, to securing circuits against copying.

During fabrication, circuit designs are vulnerable to being over produced, reverse engineer, or replicated. This is a problem, for example, for design-only firms that make their revenue by licensing their design files to fabricators ("fabs") and end users.

SUMMARY

Principles of the invention provide techniques for digital logic locking of analog circuits. In one aspect, an exemplary apparatus includes an analog circuit that has an unlocked state and a locked state. The unlocked state is such that a first selectable resistance in the analog circuit matches a second selectable resistance in the analog circuit within a designed ratio and tolerance. The locked state is such that the first selectable resistance and the second selectable resistance do not match within the designed ratio and tolerance. A first plurality of transistors are connected as the first selectable resistance in the analog circuit, and a second plurality of transistors are connected as the second selectable resistance in the analog circuit. The apparatus also includes an off-chip memory that stores a logic lock key and a controller that is connected in communication with the off-chip memory and in communication with the first and second pluralities of transistors. The controller is configured by firmware to retrieve the logic lock key from the off-chip memory and then to select the first and second selectable resistances of the analog circuit, thereby setting the analog circuit to its unlocked state, by sending a first portion of the logic lock key to operate the first plurality of transistors and sending a second portion of the logic lock key to operate the second plurality of transistors.

According to another aspect, an exemplary method includes unlocking an analog circuit, which has an unlocked state and a locked state, by supplying to the analog circuit a logic lock key that interacts with transistors of the analog circuit to set the analog circuit to the unlocked state.

According to another aspect, an exemplary method includes measuring inline data of a first plurality of transistors constituting a first resistance and a second plurality of transistors constituting a second resistance, in an analog circuit that functions as designed only when the first and second resistances match within a design ratio and tolerance; recording the inline data in digital format; determining from the inline data a combination of transistors in the first plurality of transistors and the second plurality of transistors that can be operated to make the first resistance match the second resistance within the design ratio and tolerance; and generating a logic lock key that is a bit code that describes the combination of transistors determined from the inline data.

In view of the foregoing, techniques of the present invention can provide substantial beneficial technical effects. For example, one or more embodiments provide one or more of:

An ability to select who or what can use an analog circuit by controlling access to a digital key code that unlocks the circuit.

Some embodiments may not have these potential advantages and these potential advantages are not necessarily required of all embodiments. These and other features and advantages of the present invention will become apparent from the following detailed description of illustrative embodiments thereof, which is to be read in connection with the accompanying drawings.

DETAILED DESCRIPTION

As noted, principles of the invention provide techniques for digital logic locking of analog circuits. Locking a circuit prevents it functioning as designed, until an appropriate key is supplied. In the case of digital logic locking, an appropriate key is in the form, for example, of a binary number that interacts with components of the circuit to enable its designed functionality.

Figure 1:
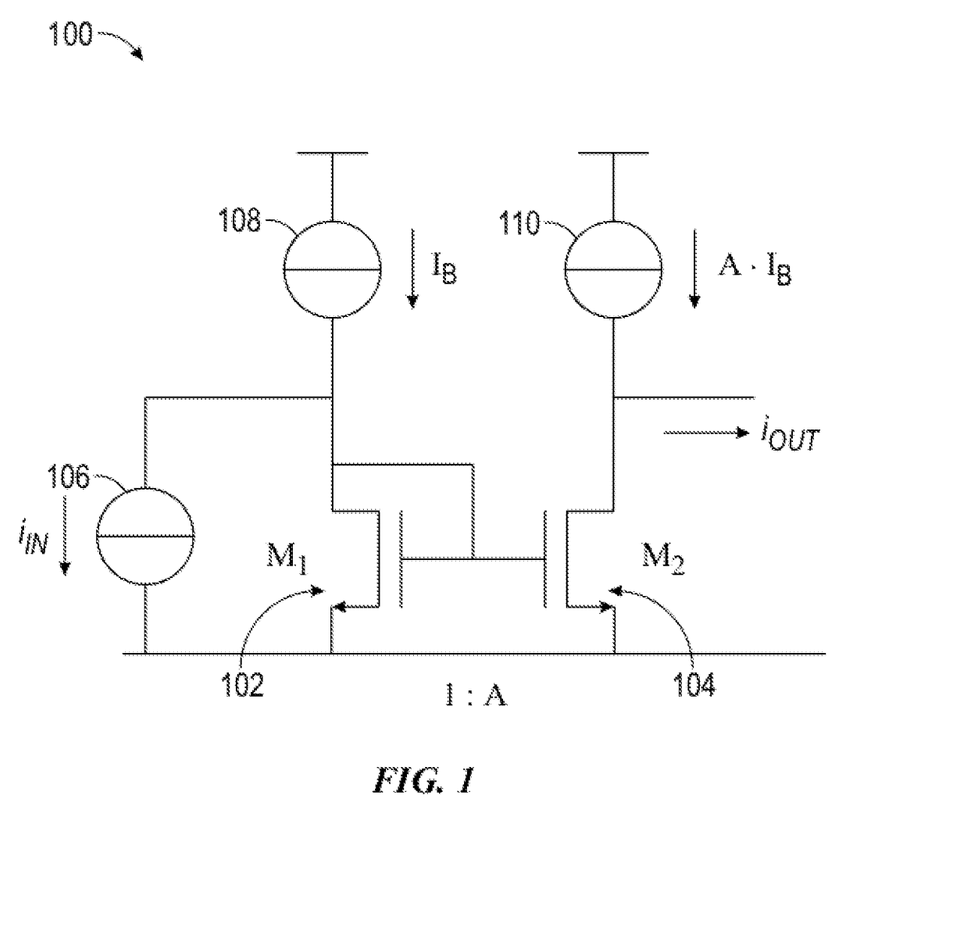
FIG. 1 depicts an analog circuit that incorporates matched transistors.

FIG. 1 depicts an analog circuit 100 that incorporates matched transistors $M_1$ 102 and $M_2$ 104, in addition to current sources $i_{IN}$ 106, $i_B$ 108, and $A \cdot i_B$ 110. The analog circuit 100 functions as a current amplifier that provides $i_{OUT} = A \cdot i_{IN}$. In the analog circuit 100, transistors 102, 104 are matched in a 1:1 ratio regarding ON resistance. Embodiments and aspects of the invention are equally applicable, for example, to other types of circuits in which circuit functionality requires transistors to match each other (within a certain tolerance or ratio) in their electrical properties. Exemplary tolerance for the analog circuit 100 is 1:1, +/−5% in resistance. However, various circuit designs will enable various matching tolerances or ratios. An aspect of the invention is that the analog circuit 100 does not function as designed if the transistors 102, 104 do not match within tolerance. For example, in one or more embodiments, the analog circuit 100 is designed to produce a first output, within +/−5%, when transistor 102 matches transistor 104 at a first ratio, within +/−5%. In such embodiments, if transistor 102 does not match transistor 104 as specified, the analog circuit 100 produces a second output that differs from the first output by more than 5%.

Figure 2:
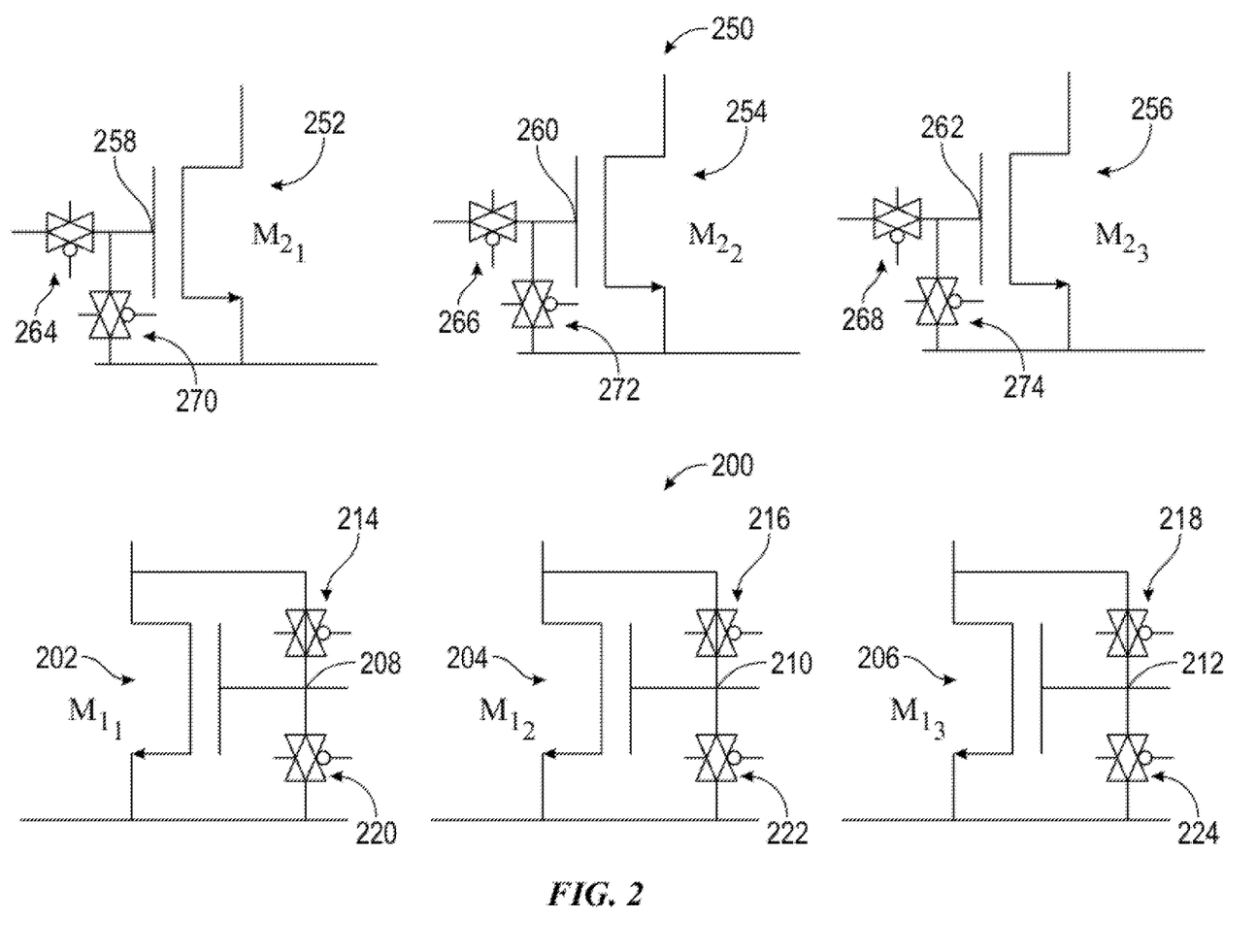
FIG. 2 depicts multiple parallel field effect transistors that can be used for digital logic locking of the analog circuit shown in FIG. 1, according to an exemplary embodiment.

Practically, if single transistors are used for $M_1$ and $M_2$, either they always match in tolerance or they never match in tolerance. FIG. 2 provides a way to switch or toggle matching properties. FIG. 2 shows $M_1$ as a bank 200 of parallel transistors 202, 204, 206 and $M_2$ as a bank 250 of parallel transistors 252, 254, 256. As manufactured, each transistor in the banks 200 and 250 has different properties than its parallel partners. By triggering one or more of the transistors 202, 204, 206 in the bank 200, or one or more of the transistors 252, 254, 256 in the bank 250, it is possible to select different electrical properties for the bank 200 or 250 as a whole. If the banks of parallel transistors, such as the transistor banks 200 and 250 of FIG. 2, are substituted for $M_1$ and $M_2$ in FIG. 1, it becomes possible to select the properties of $M_1$ and $M_2$ so that sometimes they match within tolerance and at other times they do not match; thus, sometimes the analog circuit 100 is "unlocked," and functions as intended, while at other times it is "locked" and does not function as intended, for example as discussed above.

Looking again at FIG. 2, the three transistors 202, 204, 206 have gate terminals 208, 210, 212 while the three transistors 252, 254, 256 have gate terminals 258, 260, 262. Providing "1" or "0" voltages to each terminal 208, 210, 212 will turn on or leave off the respective transistor 202, 204, 206. A "1" voltage can be provided to a given terminal (e.g., 208) by turning on a logic voltage pass gate (e.g., 214) while a "0" voltage can be provided by turning off the logic voltage pass gate and turning on a ground pass gate (e.g., 216). Thus, turning ON different transistors in the banks 200, 250 will cause each bank to have different effective channel width (resistance) of the different transistors. Depending on which transistor should be turned ON, pass gates 214, 216, 218, 264, 266, 268 can be turned ON to provide logic voltage to gate terminals 208, 210, 212, 258, 260, 262 (respectively); or pass gates 220, 222, 224, 270, 272, 274 can be turned ON to ground gate terminals 208, 210, 212, 258, 260, 262 (respectively). Thus, the inline data of the FETs (measured at step 402, shown in FIG. 4) will be used at step 406 (shown in FIG. 4) to determine which transistors need to be turned ON in order to achieve a satisfactory match between the banks 200 and 250; in other words, what will be the Logic Lock Key 306 (discussed with reference to FIG. 3).

FIG. 2 shows an embodiment in which the transistors are n-doped field effect transistors (NFETs), which turn on when a "1" is provided to the gate. In other embodiments, the transistors are p-doped FETs, which turn on when a "0" is provided to the gate. In other embodiments, the transistors are npn- or pnp-doped bipolar junction transistors (BJTs), which turn on when the base-emitter junction is forward biased by a voltage that depends on the base semiconductor material (e.g., about 0.7 V for silicon or about 0.3 V for germanium). In BJT embodiments, the logic voltage pass transistors are turned on to forward bias the base-emitter junctions while the ground pass transistors are turned on to prevent the base-emitter junctions being forward biased. Referring again to FIG. 1, the voltages provided to the pass gates 214, 216, 218, etc. constitute a "lock code" for the banks of transistors 200, 250. Thus, properties of $M_1$ and $M_2$ can be selected by inputting a bit code to the pass gates of each bank of transistors 200 or 250. A correct bit code provides logic voltage to terminals of transistors in each bank, or grounds terminals of transistors in each bank, causing properties of $M_1$ and $M_2$ (e.g., resistance) to match within a tolerance and/or ratio, so that the analog circuit 100 unlocks and functions as designed. Any incorrect bit code causes the properties not to match, so that the analog circuit 100 locks and does not function as designed. Thus, part of the operation of the analog circuit 100 can include "unlocking" the circuit by inputting the correct bit codes to the transistor banks $M_1$ 200 and $M_2$ 250.

Figure 3:
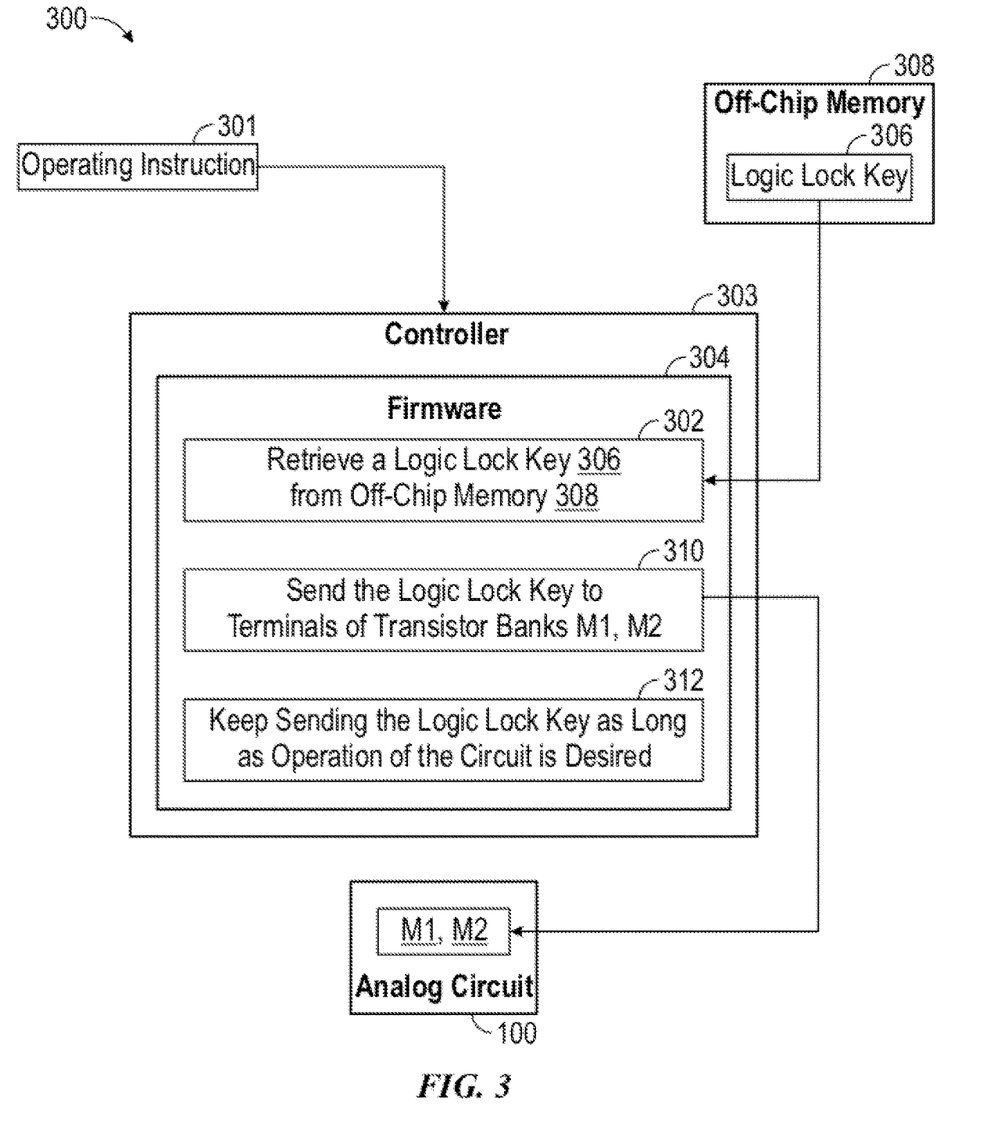
FIG. 3 depicts steps of a method for digitally locking and unlocking the analog circuit shown in FIG. 1, according to an exemplary embodiment.

FIG. 3 depicts steps of a method 300 for digitally unlocking the analog circuit 100. At 302, in response to an operating instruction 301 (e.g., a digital signal that activates the circuit), a controller 303 (e.g., a special-purpose processor such as an ASIC or FPGA) implements firmware 304 that retrieves a Logic Lock Key 306 (an individual unique binary bit code that corresponds to a die base die ID (e.g., the lot number, the wafer number and the position on the wafer) of the analog circuit 100) from off-chip memory 308 (in one or more embodiments, a non-volatile memory). At 310, the firmware 304 sends the lock code to the pass gates of the transistor banks $M_1$ 200 and $M_2$ 250 so that the pass gates provide logic voltage to individual transistor control terminals or ground the control terminals, depending how the transistors should be operated to balance the circuit. At 312, the firmware 304 keeps sending the Logic Lock Key 306 as long as operation of the circuit 100 is desired. As long as the Logic Lock Key 306 is delivered to the transistor banks $M_1$ and $M_2$, the circuit 100 functions as designed.

Figure 4:
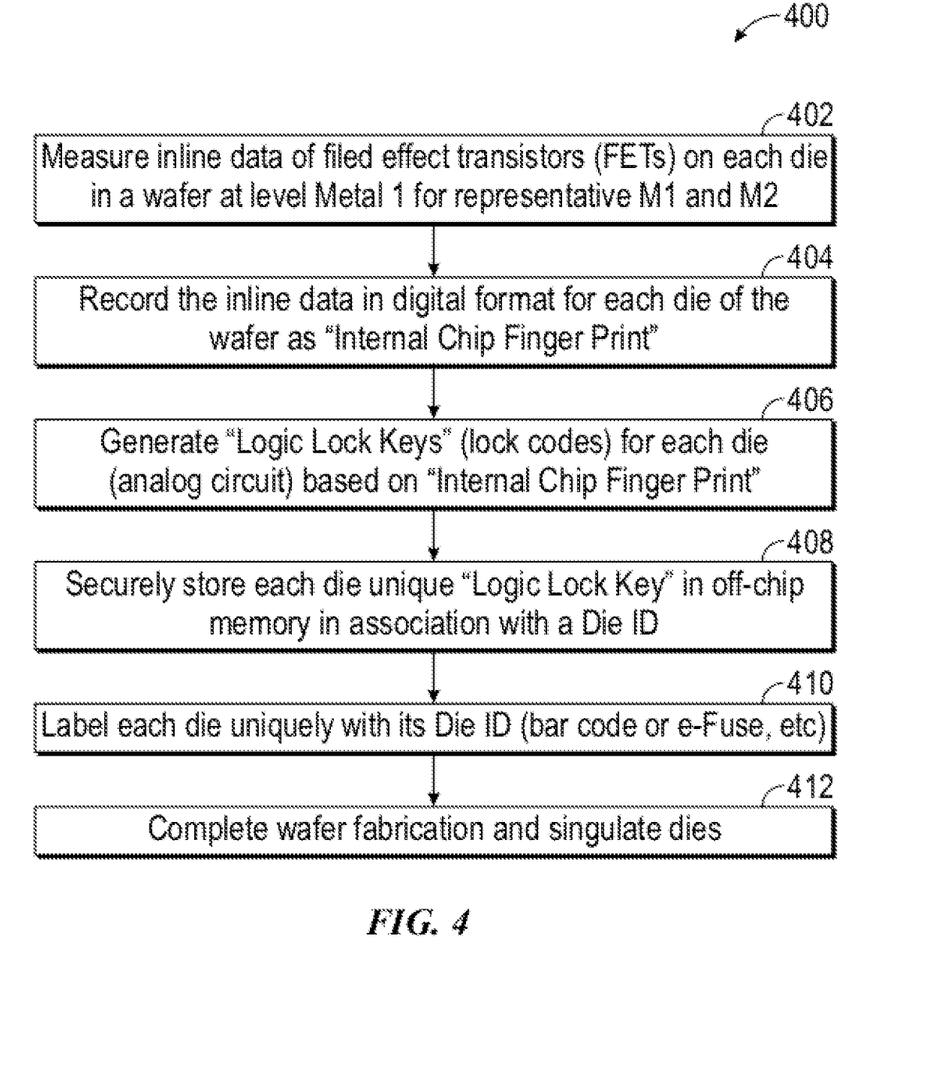
FIG. 4 depicts steps of a method for determining a digital logic lock code for the multiple parallel transistors shown in FIG. 2, according to an exemplary embodiment.
Figure 5:
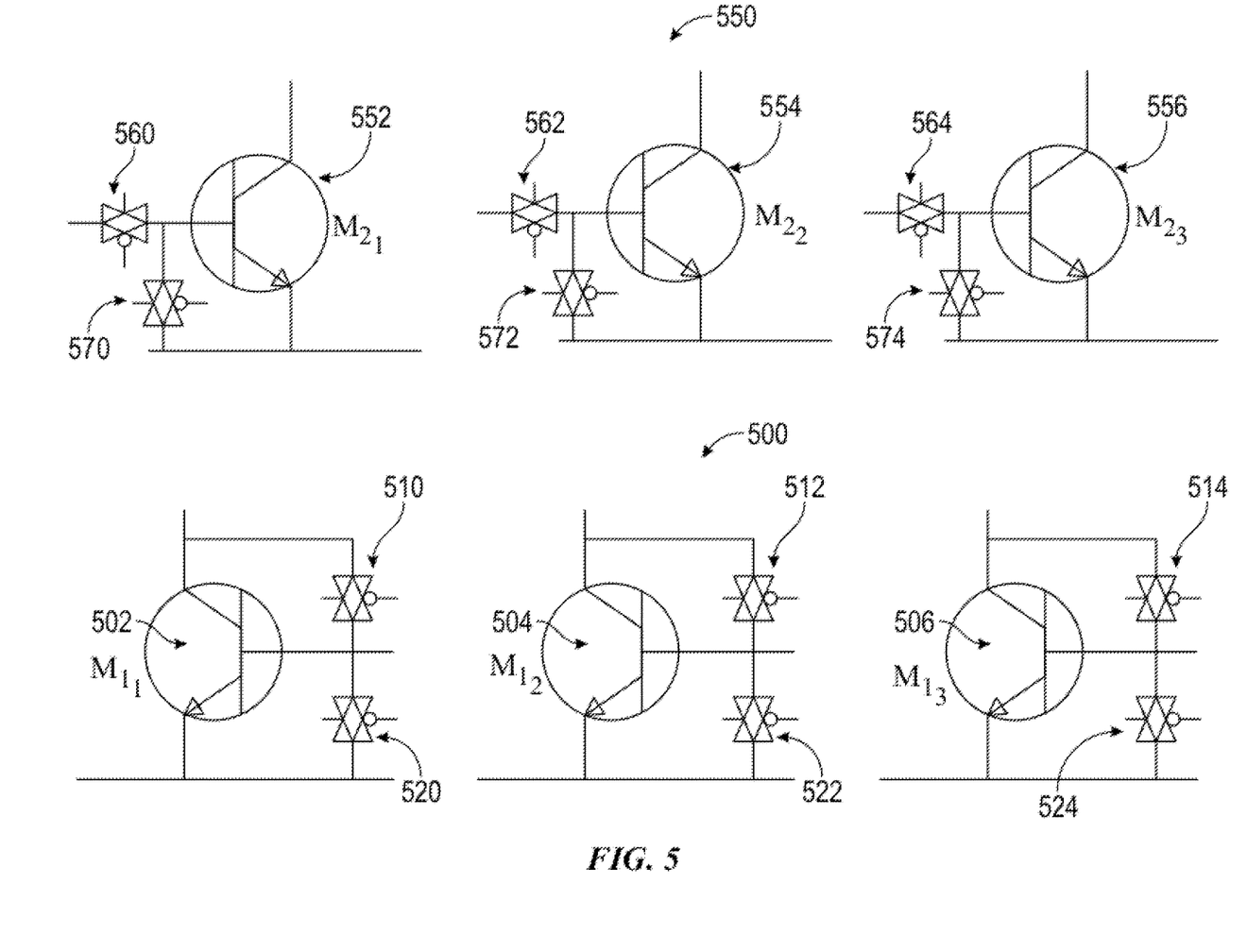
FIG. 5 depicts multiple parallel bipolar junction transistors that can be used for digital logic locking of the analog circuit shown in FIG. 1, according to an exemplary embodiment.

FIG. 4 depicts steps of a method 400 for establishing the Logic Lock Key 306 of the analog circuit 100. At 402, measure inline data of field effect transistors (FETs) 202, 204, 206 and 252, 254, 256 on each die in a wafer at level Metal 1 for the representative $M_1$ and $M_2$. A skilled person is familiar with back-end-of-line (BEOL) metallization and metal layers in integrated circuits. At 404, record the inline data in digital format for each die of the wafer as an "Internal Chip Finger Print." The inline data can include, for example, effective channel widths (corresponding to ON resistances) of each transistor in the pluralities of transistors where the transistors are FETs (as shown in FIG. 2); or where the transistors are BJTs (as shown in FIG. 5), the inline data can include the common-emitter current gain (β, which depends on the width of the base region and the relative doping of the common, emitter, and base regions. At 406, generate "Logic Lock Keys" (lock codes 306) for each die (analog circuit 100) based on the "Internal Chip Finger Print." For a practical number of transistors in each transistor bank $M_1$ and $M_2$, the logic lock keys can be generated by "brute force" permutation of measured effective channel widths to obtain equivalent total channel widths for each of the transistor banks. It is estimated that the brute force approach would take less than one half second for a conventional laptop computer to implement for a practical number of transistors in each bank (e.g., a dozen or fewer transistors per bank). Other modes for generating the logic lock keys will be apparent to a skilled person. At 408, securely store each die-unique "Logic Lock Key" in off-chip memory 308 in association with a Die ID. At 410, label each die uniquely with its Die ID (bar code or e-Fuse, etc.). At 412, complete wafer fabrication and singulate dies. Then to use the analog circuit 100, perform method 300.

In one or more embodiments, $M_1$ and $M_2$ mismatch could be +/−20% (or more) depending which transistors are turned ON or OFF. In one or more embodiments, $M_1$ and $M_2$ could be laid out differently, such as one in dense environment and one in sparse environment. In one or more embodiments, the analog circuit 100 is designed to produce a first output, within +/−5%, when $M_1$ matches $M_2$ at a first ratio, within +/−5%. In such embodiments, if $M_1$ does not match $M_2$ as specified, the analog circuit 100 produces a second output that differs from the first output by more than 5%. In one or more embodiments, $M_1$ and $M_2$ could include 1x, 0.2x, 0.1x, and 0.05x channel widths in their transistors. Then, to make $M_1$ 15% wider than $M_2$, turn on three of the $M_1$ transistors (1x, 0.1x and 0.05x), and just one of the $M_2$ transistors (1x). In another embodiment, to make $M_2$ 1.05x wider than $M_1$, turn on two $M_2$ transistors (1x, 0.05x) and just one $M_1$ transistor (1x). Multiple sets of transistors can be used in a circuit to increase the number of lock bits needed to unlock the circuit.

Although the examples presented herein assume that $M_1$ needs to match $M_2$ within a set tolerance (e.g., 5%) from a 1:1 ratio of width, in certain analog circuits it may be desirable for $M_1$ to match $M_2$ at some other ratio (e.g., 2:1, 1.4:1). Aspects of the invention encompass any analog circuit in which two different banks of parallel transistors need to match in effective width within a certain tolerance in order for the circuit to function as designed, with unlock codes being supplied to the banks of parallel transistors in order to achieve the required match.

Note, also, that although the transistor banks 200 and 250 each are shown as banks of parallel transistors, in one or more embodiments $M_1$ and/or $M_2$ may be formed as more complex networks of transistors, i.e. some transistors in parallel and additional transistors in series.

While the preceding discussion focuses on unlocking the analog circuit 100, a skilled person will appreciate that locking the circuit is equally important. In one or more embodiments, the circuit can be locked, with a very high degree of statistical confidence, by sending it a random bit code. In one or more embodiments, the circuit can, with a very high degree of statistical confidence, be locked by sending it a sequence of "1" bits that turns ON all of the transistors.

FIG. 1 shows the schematic symbols for field effect transistors (FETs) $M_1$ and $M_2$. However, bipolar junction transistors (BJTs) are believed to be equally useful in one or more embodiments of the invention. Accordingly, FIG. 5 depicts transistor banks 500 and 550 that incorporate BJTs 502, 504, 506 and 552, 554, 556 with corresponding logic voltage pass transistors 510, 512, 514, 560, 562, 564 and ground pass transistors 520, 522, 524, 570, 572, 574. In one or more embodiments, transistor banks 500, 550 can be used in place of selectable-resistance transistors $M_1$, $M_2$ in FIG. 1.

Given the discussion thus far, it will be appreciated that, in general terms, an exemplary apparatus, according to an aspect of the invention, includes an analog circuit 100 that has an unlocked state and a locked state. The analog circuit includes a first plurality of transistors 200 that are connected as a first selectable resistance 102 in the analog circuit, and a second plurality of transistors 250 that are connected as a second selectable resistance 104 in the analog circuit. The unlocked state is such that the first selectable resistance matches the second selectable resistance within a designed ratio and tolerance, and the locked state is such that the first selectable resistance and the second selectable resistance do not match within the designed ratio and tolerance. The apparatus also includes an off-chip memory 308 that stores a logic lock key 306; and a controller 303 that is connected in communication with the off-chip memory and in communication with the first and second pluralities of transistors. The controller is configured by firmware 304 to retrieve the logic lock key from the off-chip memory and then to select the first and second selectable resistances of the analog circuit, thereby setting the analog circuit to its unlocked state, by sending a first portion of the logic lock key to operate the first plurality of transistors and sending a second portion of the logic lock key to operate the second plurality of transistors.

In one or more embodiments, the first plurality of transistors 200 comprise two or more transistors connected in parallel. In one or more embodiments, the second plurality of transistors 250 comprise two or more transistors connected in parallel. In one or more embodiments, the first plurality of transistors are field effect transistors. In one or more embodiments, at least one of the first plurality of transistors is a p-doped field effect transistor. In one or more embodiments, at least one of the second plurality of transistors is an n-doped field effect transistor. In one or more embodiments, at least one of the first plurality of transistors is a bipolar junction transistor.

In one or more embodiments, the logic lock key selects the first and second resistances of the analog circuit to match at a 1:1 ratio within 5%.

According to another aspect, an exemplary method 300 includes unlocking an analog circuit 100, which has an unlocked state and a locked state, by at 310 supplying to the analog circuit a logic lock key 306 that interacts with first and second pluralities of transistors 200, 250 of the analog circuit to set the analog circuit to the unlocked state.

In one or more embodiments, the unlocked state is such that a first selectable resistance in the analog circuit matches a second selectable resistance in the analog circuit within a designed ratio and tolerance, and the locked state is such that the first selectable resistance and the second selectable resistance do not match within the designed ratio and tolerance.

In one or more embodiments, the method 300 includes at 302 retrieving the logic lock key 306 from an off-chip memory 308 that is formed on a separate device from the analog circuit, and at 310 setting the analog circuit to its unlocked state by supplying respective first and second portions of the logic lock key to the first and second pluralities of transistors.

Supplying the logic lock key to the analog circuit selects the first and second selectable resistances of the analog circuit to match each other within the designed ratio and tolerance by a first portion of the logic lock key operating a first plurality of the transistors and a second portion of the logic lock key operating a second plurality of the transistors.

In one or more embodiments, the method includes locking the analog circuit, by supplying a code other than the logic lock key to the analog circuit. In one or more embodiments, generating the code other than the logic lock key is done by recourse to a random number generator. In one or more embodiments, the method includes generating the code other than the logic lock key as a sequence of "1" bits.

According to another aspect, an exemplary method 400 includes, at 402, measuring inline data of a first plurality of transistors constituting a first resistance and a second plurality of transistors constituting a second resistance, in an analog circuit that functions as designed only when the first and second resistances match within a design ratio and tolerance. At 404, record the inline data in digital format. At 406, determine from the inline data a combination of transistors in the first plurality of transistors and the second plurality of transistors that can be operated to make the first resistance match the second resistance within the design ratio and tolerance, and generate a logic lock key that is a bit code that describes the combination of transistors determined from the inline data.

In one or more embodiments, the method also includes, at 310, causing the analog circuit to function as designed by supplying a first portion of the logic lock key 306 to the first plurality of transistors and supplying a second portion of the logic lock key to the second plurality of transistors.

In one or more embodiments, the inline data comprises effective channel widths of each of the first plurality of transistors and each of the second plurality of transistors. In one or more embodiments, determining the combination of transistors comprises permuting effective channel widths of subsets of the first plurality of transistors and of the second plurality of transistors until a total effective channel width of a given subset of the first plurality of transistors matches a total effective channel width of a given subset of the second plurality of transistors within a predetermined tolerance.

In one or more embodiments, the predetermined tolerance is +/−5%.

In one or more embodiments, the method also includes storing the logic lock key in an off-chip memory in association with an identifier of a circuit that comprises the first and second pluralities of transistors.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
an analog circuit that has an unlocked state and a locked state, the analog circuit comprising:
a first plurality of transistors that are connected as a first selectable resistance in the analog circuit, and
a second plurality of transistors that are connected as a second selectable resistance in the analog circuit,
wherein the unlocked state is such that the first selectable resistance matches the second selectable resistance within a predetermined ratio and tolerance, and the locked state is such that the first selectable resistance and the second selectable resistance do not match within the predetermined ratio and tolerance;
an off-chip memory that stores a logic lock key; and
a controller that is connected in communication with the off-chip memory and in communication with the first and second pluralities of transistors, wherein the controller is configured by firmware to retrieve the logic lock key from the off-chip memory and then to select the first and second selectable resistances of the analog circuit, thereby setting the analog circuit to its unlocked state, by sending a first portion of the logic lock key to operate the first plurality of transistors and sending a second portion of the logic lock key to operate the second plurality of transistors.

2. The apparatus of claim 1, wherein the first plurality of transistors comprise two or more transistors connected in parallel.

3. The apparatus of claim 2, wherein the second plurality of transistors comprise two or more transistors connected in parallel.

4. The apparatus of claim 1, wherein the first plurality of transistors are field effect transistors.

5. The apparatus of claim 1, wherein at least one of the second plurality of transistors is an n-doped field effect transistor.

6. The apparatus of claim 1, wherein at least one of the first plurality of transistors is a bipolar junction transistor.

7. The apparatus of claim 6, wherein the at least one of the first plurality of transistors that is a bipolar junction transistor is an npn-doped bipolar junction transistor.

8. The apparatus of claim 1, wherein the logic lock key selects the first and second resistances of the analog circuit to match at a predetermined 1:1 ratio within a predetermined 5% tolerance.

9. A method comprising:
retrieving a logic lock key from an off-chip memory that is formed on a separate device from an analog circuit, the analog circuit comprising a first plurality of transistors that provide a first selectable resistance and a second plurality of transistors that provide a second selectable resistance, wherein the analog circuit has an unlocked state in which the first and second selectable resistances match within a predetermined ratio and tolerance and has a locked state in which the first and second selectable resistances do not match within the predetermined ratio and tolerance; and
setting the analog circuit to its unlocked state by supplying respective first and second portions of the logic lock key to the first and second pluralities of transistors; wherein supplying the logic lock key to the analog circuit selects the first and second selectable resistances of the analog circuit to match each other within the designed ratio and tolerance by the first portion of the logic lock key operating the first plurality of transistors and the second portion of the logic lock key operating the second plurality of transistors.

10. The method of claim 9, further comprising:
locking the analog circuit, by supplying a code other than the logic lock key to the analog circuit.

11. The method of claim 10, further comprising:
generating the code other than the logic lock key by recourse to a random number generator.

12. The method of claim 10, further comprising:
generating the code other than the logic lock key as a sequence of "1" bits.

13. A method comprising:
measuring inline data of a first plurality of transistors constituting a first resistance and a second plurality of transistors constituting a second resistance, in an analog circuit that functions as designed only when the first and second resistances match within a predetermined ratio and tolerance;
recording the inline data in digital format;
determining from the inline data a combination of transistors in the first plurality of transistors and the second plurality of transistors that can be operated to make the first resistance match the second resistance within the predetermined ratio and tolerance; and
generating a logic lock key that is a bit code that describes the combination of transistors determined from the inline data; causing the analog circuit to function as designed by supplying a first portion of the logic lock key to the first plurality of transistors and supplying a second portion of the logic lock key to the second plurality of transistors.

14. The method of claim 13, wherein the inline data comprises effective channel widths of each of the first plurality of transistors and each of the second plurality of transistors.

15. The method of claim 13, wherein determining the combination of transistors comprises permuting effective channel widths of subsets of the first plurality of transistors and of the second plurality of transistors until a total effective channel width of a given subset of the first plurality of transistors matches a total effective channel width of a given subset of the second plurality of transistors within a predetermined tolerance.

16. The method of claim 15, wherein the predetermined tolerance is +/−5%.

17. The method of claim 13, further comprising storing the logic lock key in an off-chip memory in association with an identifier of a circuit that comprises the first and second pluralities of transistors.

18. The method of claim 17, further comprising reading the identifier of the circuit from a label on the analog circuit.

\* \* \* \* \*